United States Patent
Zhao (10) Patent No.: US 6,232,018 B1
(45) Date of Patent: May 15, 2001

(54) ELECTRODE PLATE FOR A LEAD ACID ACCUMULATOR AND ITS PRODUCING METHOD

(75) Inventor: Yunnuo Zhao, Baotou (CN)

(73) Assignee: Baotou Science & Technology Service Corporation, Baotou (CN)

( * ) Notice: Subject to any disclaimer, the term of this patent is extended or adjusted under 35 U.S.C. 154(b) by 0 days.

(21) Appl. No.: 09/011,564

(22) PCT Filed: Aug. 13, 1996

(86) PCT No.: PCT/CN96/00062

§ 371 Date: May 11, 1998

§ 102(e) Date: May 11, 1998

(87) PCT Pub. No.: WO97/07553

PCT Pub. Date: Feb. 27, 1997

(30) Foreign Application Priority Data

Aug. 14, 1995 (CN) ................................................ 95109703
Aug. 14, 1995 (CN) ................................................ 95219415

(51) Int. Cl.[7] ............................. H01M 4/14; H01M 4/73
(52) U.S. Cl. ............................................ 429/235; 429/225
(58) Field of Search ...................................... 429/225, 226, 429/235, 236; 29/623.5, 2

(56) References Cited

U.S. PATENT DOCUMENTS 3,702,019 * 11/1972 Pollack .
5,139,902 * 8/1992 Drews et al. ........................ 429/234

FOREIGN PATENT DOCUMENTS

2331159 * 7/1977 (FR) ............................... H01M/4/64

* cited by examiner

Primary Examiner—Carol Chaney (57) ABSTRACT

An electrode plate for lead acid accumulator comprises an activated base including lead fiber accounting for 60–90 wt % of said activated base and cadmium containing lead alloy fiber, which are mixed homogeneously and interwoven; a plate grid for collecting current and conducting electricity in combination with said activated base; a lug for electrical connection between electrode plates, said lug is electrically connected with said plate grid and is fixed thereon. Furthermore, a method for producing the electrode plate is provided, the method comprises steps, in which lead and lead alloy fibers cut into short sections are poured into sticky solution in order they are mixed with each other homogeneously in three dimensional direction by stirring.

23 Claims, 3 Drawing Sheets

ELECTRODE PLATE FOR A LEAD ACID ACCUMULATOR AND ITS PRODUCING METHOD

FIELD OF THE INVENTION

The invention relates to an electrode plate for a lead acid accumulator and its producing method.

BACKGROUND OF THE INVENTION

In Chinese Patent Application CN 1051273A, entitled "plate shaped acid positive electrode", issued on May 8, 1991, an electrode plate is disclosed, which consists of two overlain electrically conducting plates with the same structure. The peripheries of the adjacent faces of two electrically conducting plates are provided with a main rib and each of electrically conducting plates is provided with substantially equal quantity of liquid incoming apertures. Meanwhile, the adjacent faces of two electrically conducting plates are coated with lead powder. In order to prolong the lifetime of electrode plate, the binding strength of the lead powder coating to the electrode plate is enhanced by providing crimping edge around peripheries of the adjacent faces, or arranging reinforce ribs on the adjacent faces of electrically conducting plates. This patent has raised the lifetime of the electrode plate at certain level. However, from the point of view of overall behavior of the accumulator, the over thickness of the electrode plate leads to the reduction of specific energy.

Another Chinese patent application CN 2073171U, entitled "lead acid accumulator having high specific energy and long lifetime", issued on Mar. 13, 1991, proposes a technical solution to reduce the thickness of an electrode plate in an accumulator, the way of which is to thin the plate grid of positive electrode plate to 4.0–7.5 mm. At the same time, the plate grid of a negative electrode plate is also to be thinned correspondingly, so that in a same container of the lead acid accumulator the number of electrode plates is increased relatively (i.e. the surface area is increased), and the polarization current for charging and discharging is reduced. Therefore, the specific energy is increased under the precondition that the lifetime is not damaged. However, the increase of specific energy by means of incressament of the surface area by thinning the electrode plate, generally speaking, will undoubtedly damage the lifetime and the strength of the electrode plates. Such disadvantage is just a problem difficult to be solved for several years in the accumulator field.

The technical solutions disclosed in the above mentioned two patents can not radically overcome the contradiction between the lifetime and the specific energy of an accumulator. Meanwhile, the recycling rate of cadmium is low, and the production cost is high.

Accordingly, the object of the present invention is to provide an electrode plate having high specific energy, high power, long lifetime, resistance to overdischarge and rapid charging, as well as its producing method.

SUMMARY OF THE INVENTION

The invention provides an electrode plate for lead acid accumulator comprising: an activated base, including lead fibre and cadmium-containing lead alloy fibre which are mixed and interwoven homogeneously; said lead fibre accounting for 60–90 wt % of said base, and the surface of said lead fibre being plated with cadmium accountihg for 1–5 wt % of the total weight of said lead fibre;

a plate grid for collecting current and conducting electricity in combination with said activated base; and a lug, used in the electrically connection between the electrode plates and electrically fixed on said plate grid.

The invention also provides a method for producing the electrode plate, comprising following steps:

by means of cutting, melting pressing or melting blowing process, the lead fibre and lead alloy fibre are produced from lead and cadmium-containing lead alloy;

these fibers are cut into sections;

these sections of lead fibre and lead alloy fibre are put into a sticky solution; by means of stirring, a mixture which is mixed and interwoven homogeneously in three dimension is formed;

said solution is pressed out of said mixture to form a blank block;

the blank block is compressed;

a plate grid is formed on the blank block by means of melting pressing process; and a lug is connected to said plate grid.

The electrode plate for a lead acid accumulator according to the invention will be described in detail with reference to the appended drawings.

DETAILED DESCRIPTION OF THE PREFERRED EMBODIMENTS

The electrode plate for a lead acid accumulator according to the present invention comprises activated bases 3, 301, 302, and plate grds 2, 7 for collecting electrical current and conducting electricity, as well as plates 4, 5 for enhancing the mechanical strength of the activated base. It is understood that the plate grids 2, 7 also have the function for enhancing the mechanical strength of the activated base.

The activated base according to the present invention is formed by mixing lead fibre and lead alloy fibre. It should be noted that the term "fibre" mentioned in the present invention means a very thin wire. Moreover, the term "fibre" mentioned in the present invention and the term "one or more fibre sections" below have the same meaning sometimes.

The advantage to use fibre lies in that the fibre can enlarge the surface area of activated material to raise the utilization factor of activated material and increase specific energy. After mixing two fibres, fibre felt or fibre cloth can be produced in the manner similar to the method of nonwoven cloth papermaking (AGM manner) with a lot of pores among fibres. When the reaction for forming current is going in the accumulator due to capillarity, these pores can allow enough acid liquid to flow into. Therefore the reaction can be carried out smoothly.

During preparation of the activated base, the mixing ratio among various fibres must be kept homogeneous, i.e. the ratio of various fibres per equal unit area must be similar. When the activated base is produced from bunched fibres, the fibre bunches can be made from the same fibres, or from various fibres under given mixing ratio. Generally speaking, if the number of fibres is quite great, it is better to bunch various fibres under given mixing ratio at first, and then the bunches of fibres are mixed to produce the activated base. The activated base produced according to the above mentioned method possesses the structure similar to felt or cloth. In addition, during preparation of the activated base, in order to obtain an electrode plate having better strength and current collecting and electricity conducting properties, the base block which is produced according to the above mentioned method can be arranged alternately with lead alloy felt which is fully made from lead alloy fibre. Then they are combined together by pressing, forming an activated base with better strength and current collecting and electricity conducting properties.

The mixed fibre used in the present invention consists mainly of lead fibre and lead alloy fibre in a given weight ratio. In order to increase strength and current collecting and electricity conducting properties of the base or the electrode plate, some other fibres and impregnants can be also added thereinto. However, in the case when no any other fibre is added, the electrode plate for a lead acid accumulator according to the present invention can be also produced from lead fibre and lead alloy fibre.

In the electrode plate according to the present invention, lead fibre accounts for 60–90 wt % of total weight of lead fibre and lead alloy fibre. Meanwhile, the surfaces of all lead fibre are plated with cadmium which accounts for 1–5 wt %. When an activated base according to the present invention is used in a positive electrode plate, on the surface of lead fibre grows a layer of $\beta$-$PbO_2$ crystal lattice; When it is used in a negative electrode plate, the surface of lead fibre remains unchanged. After reaction, the lead fibre of the electrode plate can form $\beta$-$PbO_2$ crystal lattice on the positive electrode plate under the catalysis of cadmium plated on the surface; meanwhile the $\beta$-$PbO_2$ crystal lattice develops from surface to deeper portions, and finally a state where the core is pure lead and the surface layer is of $\beta$-$PbO_2$ crystal lattice is formed. During discharge of an accumulator, $\beta$-$PbO_2$ crystal lattice on the surface layer of the electrode plate reacts with acid to form electric charge and the pure lead core is used as a channel for transmitting electricity.

The lead alloy fibre accounts for 10–40 wt % of the total weight of lead fibre and lead alloy fibre. Meanwhile the surface thereof can be plated with cadmium which accounts for 1–5 wt %. During utilization, $\beta$-$PbO_2$ crystal lattice is formed on the surface layer of lead alloy fibre in the positive electrode plate, while a pure lead layer is formed on the surface of lead alloy fibre in the negative electrode plate. However, whatever for the positive electrode plate or for the negative one, the initial alloy state always remains in the core of the lead alloy fibre.

The key point of the present invention is to mix the above mentioned two fibres under given ratio for producing an activated base to be used in the electrode plate for a lead acid accumulator. Lead alloy fibre itself possesses high strength, satisfactory corrosion resistance and rather good electric conductivity. Therefore, in combination with the plate grid for collecting current and conducting electricity, the base which consists of mixture of lead fibre and lead alloy fibre can meet the demands on the strength and the current collecting and electricity conducting properties during utilization, and can prevent the electrode plate from a poor mechanical strength and the short circuit in the interior of the accumulator. In the prepared base, lead fibre plays the main role in producing electric charge, and lead alloy fibre in collecting current and conducting electricity as well as in supporting the whole electrode plate. Furthermore, since the lead alloy fibre contains a small amount of cadmium, $\beta$-$PbO_2$ crystal lattice can always be maintained on the surface of the positive electrode plate formed by these two fibres so as to keep the plate in a full electricity storage state.

In short, in the lead acid accumulator using the electrode plate formed with lead fibre and lead alloy fibre, since the surface of these two fibres is plated with cadmium accounting for 1–5 wt %, during the reaction due to electrization, on the surfaces of a group of electrode plates which are connected with a DC positive electrode, $\beta$-$PbO_2$ crystal lattice is formed under catalysis of cadmium. During succeeding utilization, in the continuous charge and discharge, $\beta$-$PbO_2$ crystal lattice is then maintained consistently on the surface layer of lead fibre due to catalysis of cadmium contained on the lead alloy fibre. Since the microsurface area of $\beta$-$PbO_2$ is about 20 times larger than that of $\alpha$-$PbO_2$ crystal lattice, the ability in storing electricity of the former is much greater than that of the latter. At the same time, in the present invention, $\beta$-$PbO_2$ is resulted directly from the reaction on the surface layers of the lead fibre and the lead alloy fibre, and therefore $\beta$-$PbO_2$ can attach firmly on the fibre and is not prone to fall off. Moreover, as the cores of these two kind of fibres remain in initial state, the oscillation caused by large current and pulse charging can be sustained. In addition, since $\beta$-$PbO_2$ and lead sulphate do not belong to the same crystal, lead sulphate does not nucleate on the surfaces of these fibres. In deep layer of lead fibre, $\beta$-$PbO_2$ can also be formed and is involved in the reaction, and therefore large current output can be kept for a long time in the discharging process. After preparation of a base according to the present invention, the nodes among various fibres in the mixed fibres are slightly melted together using electric spark discharge technology, so that in the core of whole electrode plate forms a reliable network for current collection and electricity conduction and that the connection strength among various fibres in the whole electrode plate is further enhanced. However, in order to use electric spark discharge technology, on the surface of lead fibre and lead alloy fibre, oxide must exist. Therefore the second role of cadmium plating is used to substitute the oxide layer so that the electric spark discharge technology can be realized.

In the lead alloy fibre, the respective weight percentages of compositions preferably are: 88–98.5 wt % for lead, 1–7 wt % for antimony and 0.5–5 wt % for cadmium. The lead alloy fibre prepared according to the above mentioned prescription is mainly used in a conventional accumulator and has rather low cost.

In the present invention, in another lead alloy fibre, the respective weight percentages of compositions can be for example: 94–99.32 wt % for lead, 0.5–5 wt % for cadmium, 0.08–0.5 wt % for calcium and 0.1–0.5 wt % for silver. The lead alloy fibre produced according to this prescription possesses rather good corrosion resistance and can raise the lifetime of an accumulator. However, the cost for producing such kind of lead alloy fibre is rather high, and the loss of electrolyte is quite large, since the over potential of hydrogen and oxygen is reduced due to the addition of silver.

Except above mentioned two fibres, the activated base according to the present invention can further contain other tiny fibres. These tiny fibres comprise carbon fibre and other organic chemical fibres. The main object to add carbon fibre is to make up for insufficient current collecting and electricity conducting properties of lead alloy fibre. Especially when the weight percentage of lead alloy fiber is quite low and the current collecting and electricity conducting effect is unsatisfactory, the addition of carbon fibre in given amount does not increase the weight obviously, but can obtain good current collecting and electricity conducting effect. The added amount of carbon fibre accounts for 0.1–0.5 wt % of total weight of lead fibre and lead alloy fibre. Furthermore, other organic chemical fibres also can be added into, mainly such as acrylic fibres which possess acid corrosion resistance and good tensile strength. The addition of these fibres is mainly for enhancing the strength of whole electrode plate. The added organic chemical fibres can play a role similar to bundle effect of string or network to integrate various fibres firmly. The added amount of organic chemical fibres should account for 0.1–0.5 wt % of total weight of lead fibre and lead alloy fibre.

In addition, after preparation of the activated base according to the present invention, the base can be put into an impregnant. The preferred impregnant is polytetrafluoroethiene. The soakage of whole activated base can prevent the fibres from movement relative to each other to avoid the reduction of strength of the activated base. The added amount of the impregnant accounts for 0.1–0.5wt % of the weight of the base. Additionally, in the activated base, 0.1–0.5 wt % carbon powder can also be added, such as acetylene carbon, expandable graphite powder, charcoal powder or activated carbon powder. All the above mentioned carbon fibres, organic chemical fibres and carbon powders are added at the time of mixing various fibres before the activated base is formed, but the impregnant is added after the activated base is formed.

Figure 1:
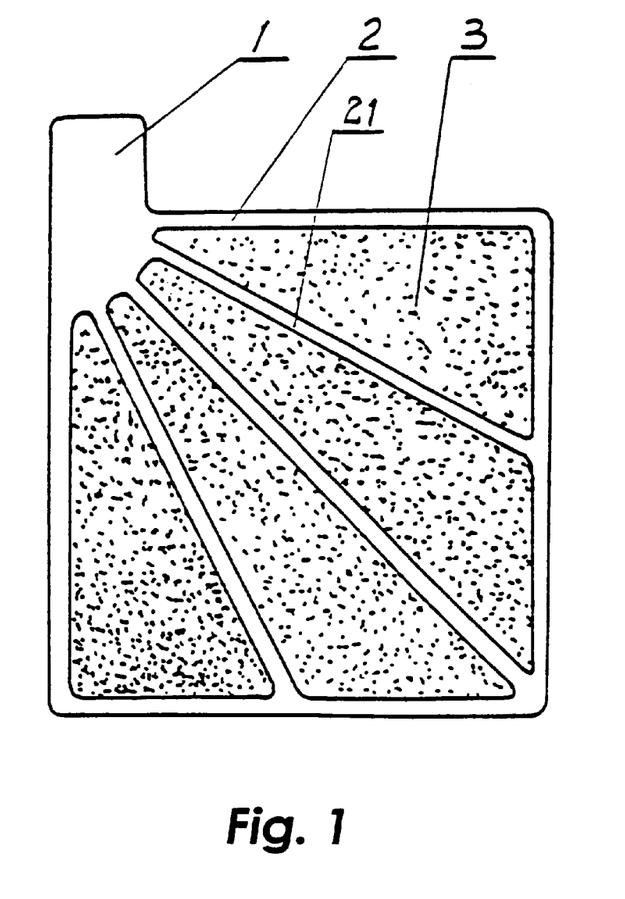
FIG. 1 is a front view of an electrode plate for a lead acid accumulator according to the present invention.
Figure 2:
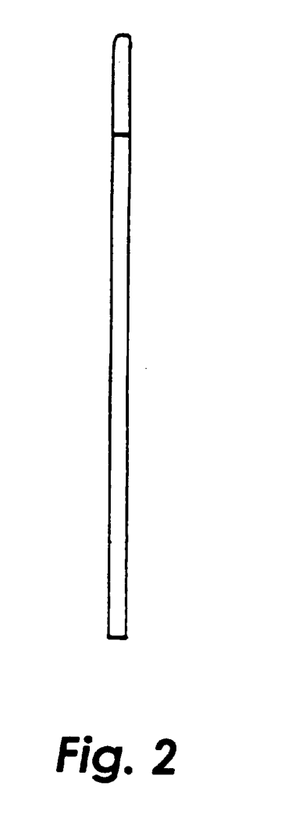
FIG. 2 is a side view of the electrode plate for the lead acid accumulator shown in FIG. 1.

As shown in FIGS. 1 and 2, the plate grid 2 which plays a role of current collection and electricity conduction and enhances the mechanical strength of the activated base, is integratively fixed onto the activated base 3. During preparation, it is preferably to form the plate grid 2 directly on the activated base 3 by means of melting pressing the activated base 3. Since the plate grid 2 obtained by melting pressing consists of same material as the activated base, the electrical connection between the plate grid 2 and the activated base 3 is good and the interior resistance is less than that in a conventional electrode plate. At the same time, non-activated material is reduced, i.e. the weight percentage of activated material is increased.

The plate grid 2 comprises grid strips 21, which are preferably radialized and converge to the connection point of the plate grid 2 with a lug to be mentioned below, making contribution to current collection and electricity conduction.

It is also possible to put two plated grids 2 (not shown), which have been produced in advance such as in frame shape, on each side of the activated base 3, and then to integrate them with the activated base 3 by melting pressing. Alternatively, the plate grid 2 can be also made of lead alloy fibre in the form of a porous net (not shown) having larger pores, then is soaked with common lead paste to help the electrode plate with the overall properties better than that of the conventional pasted electrode plate.

On the plate grid 2, a lug 1 is connected as a joint among the electrode plates. The lug 1 can be pressed out simultaneously with the formation of the plate grid 2 when the latter is being produced by melting pressing. However, in order to economize the consumption of two fibres, preferably an additional lug 1 is provided after the activated base 3 and the plate grid 2 have been integrated, i.e. the lug is a separate member such as a lead block (FIGS. 5 and 6), which has a groove with a width corresponding to the thickness of the activated base 3 and can be fixed on the formed plate grid 2 by melting pressing.

The compositions of the above mentioned lead alloy fibre felt can be the same as that of the lead alloy fibre in the activated base 3. However, since the main role of the lead alloy fibre felt is to enhance the strength and the current collection and electricity conduction properties of the electrode plate, the diameter of its lead alloy fibre should be greater, for example, bunches of lead alloy fibre can be used.

Figures 3, 4:
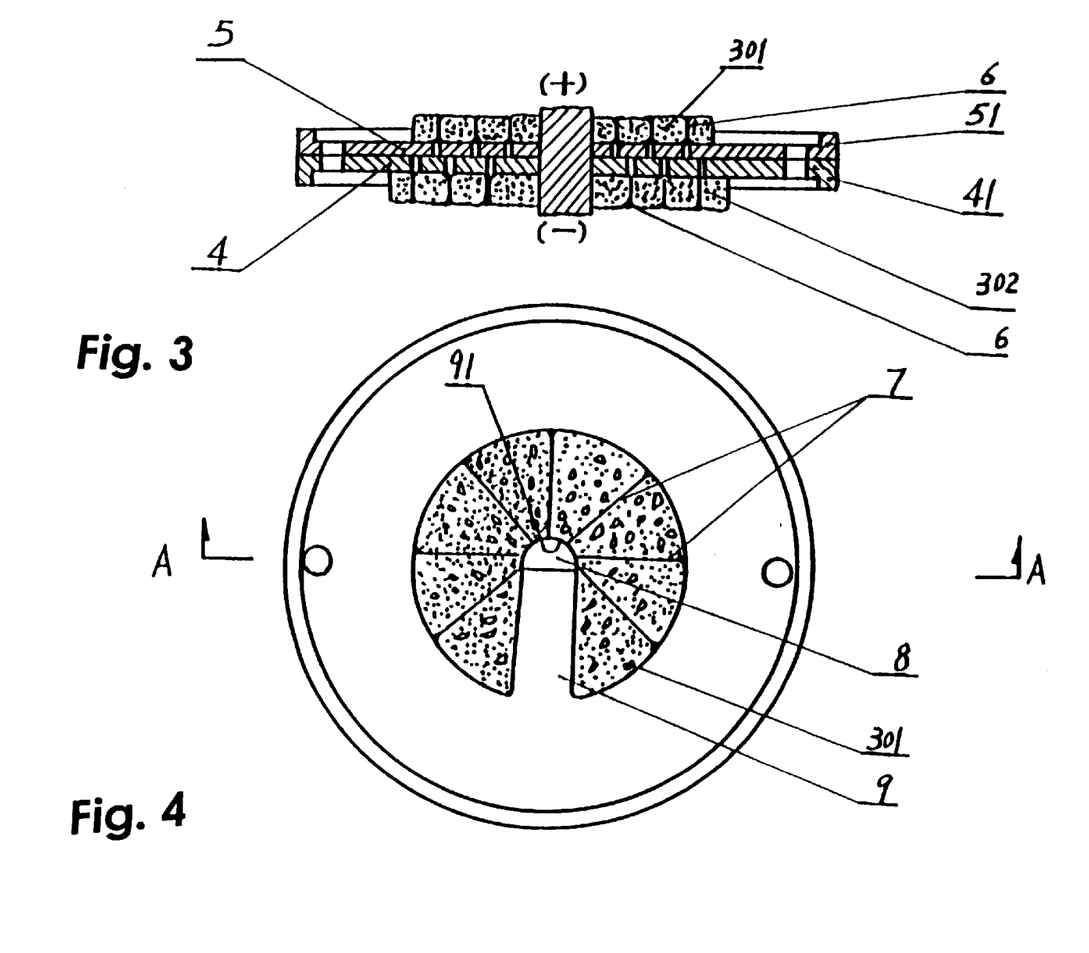
FIG. 3 is a sectional view of another electrode plate for a lead acid accumulator according to the present invention.
FIG. 4 is a front view of the electrode plate for the lead acid accumulator shown in FIG. 3.

An alternative embodiment of arrangement for assuring the mechanical strength of the base according to the present invention is shown in FIGS. 3 and 4. The arrangement consists of a bimetallic plate made of lead and another metal with satisfactory electric conductivity. In such a structure, the bimetallic plate is used both for substituting the elements connected in series between single accumulator cells, as well as for forming a bipolar electrode plate. The interior resistance of the electrode plate formed in such a manner is low.

In the embodiment, the activated bases 301, 302 which are attached on both sides of the bimetallic plate are of circular shape, on the side faces of which bases grids 7 are formed in order to assure the activated bases 301, 302 to have better strength. In the present embodiment, the plate grid 7 comprises radial pressed dints integrally formed on the bases 301, 302. On the circular activated bases 301, 302, there is an elongated notch 9 along the radial direction. The inner end 91 of the notch 9 is a semicircle and is coaxial with the respective circular activated bases. The width of the notch is equal to the diameter of the semicircle. Such a structure is used to leave a gas cavity for a fully sealed accumulator with oxygen circulation. At the same time, the problem about unsatisfied electrolyte supply to the electrode plate is solved, which is caused by Lorentz force in the lead acid accumulator, pushing the electrolyte to the periphery. Adopting such a circular structure with a notch, the electrolyte at the periphery can flow back in time to the centre.

The bimetallic plate structure consists of a metallic plate 4 on which surface a thin lead layer is plated and a lead plate 5 closely fixed thereon. In the central part of the bimetallic plate, there is a semicircular through hole 8, which shape corresponds to the semicircular interior end 91 of the elongated notch 9 of the activated bases 301, 302. The metallic plate should be made of metal having definite strength and satisfactory electric conductivity. In general, it is better of pure copper. Both the surfaces of the metallic and the lead plates should be rough, i. e. they are full of small projections and cavities in order to make the connection of the copper plate 4 and the lead plate 5 with both activated bases 301, 302 firm. The method adopted in the present invention is to provide thorns 6 on both surfaces of the copper plate 4 and one surface of the plate 5 by bumping. The copper plate 4 is connected with one surface of lead plate 5 without the thorns 6 to form the bimetallic plate structure. The height of the thorns 6 on one face of the copper plate 4 for connection with the lead plate 5 must be slightly greater than the thickness of the lead plate 5, and the height of its thorns 6 on the other face for connection with the activated base 302 must be slightly greater than the thickness of the activated base 302. Similarly, it is required that the height of the thorns 6 on the lead plate 5 must be greater than the thickness of the activated base 301 in order to assure a firmly attachement. Since the consumption of anode, the the lead plate 5 of the bimetallic plate shall functions as a positive electrode, when it is arranged in the accumulator, in order to prevent copper of the copper plate 4 from entering into electrolyte so as to affect the properties of the accumulator. At the outer periphery of the bimetallic plate structure, the crimped edges 41, 51 are provided for accommodating sealing gaskets, also for protecting sealing gaskets in practice.

After the circular activated bases 301, 302 are attached on the bimetallic plate, the semicircular through hole 8 of the bimetallic plate must be fully filled with pure lead to form connecting point of the electrode plates, i.e. the lug. Meanwhile, the thickness of the lug must be greater than that of the whole electrode plate. When the accumulator has the above mentioned electrode plate, the positive electrode (i. e. the side where the lead plate of the bimetallic plate is located) must be horizontally arranged upward, so that the stratified phenomenon can be avoided, which phenomenon occurs due to different densities of electrolyte at the time of electrochemical reaction. In addition, the oxygen which is created on the positive electrode can flow upward and combines with hydrogen on the negative electrode to form water, so that the oxygen circulation can be realized under the fully sealing condition.

The structure of the electrode plate and its producing method will be described further in conjunction with the following examples.

EXAMPLE 1

FIGS. 1 and 2 show the example 1 according to the present invention. At first the lead fibre and the lead alloy fibre are produced by melting pressing, cutting or melting blowing etc. In order to assure that the lead fibre and the lead alloy fibre possesses rather satisfactory electric conductivity, the diameters of the produced fibres are for example 8 micrometer and 15 micrometer respectively. Then on the surfaces of these two fibres, cadmium is plated correspondingly, which accounts for 2 wt % of respective weights of lead fibre and lead alloy fibre.

The compositions of the used lead alloy fibre are of 2 wt % antinomy, 2 wt % cadmium and 96 wt % lead.

Then these fibres are cut into short sections. The length of each lead fibre section is 1 mm and the length of each lead alloy fibre section is 2.5 mm.

Afterward, the sections of the lead fibre and the lead alloy fibre are mixed according to the weight ratio of 9:1. Then the mixture is put into a first container filled with glycerine and is stirred well. Then the contents in the first container are poured into the second container with a lot of pores on the bottom, and the glycerine is extracted by means of a vacuum pump which is connected to the lower part of the second container and applies extraction from bottom. Moreover, a rubber piston is located immediately on the mixture in the second container and has a diameter matched with that of the container to apply pressure from top. Therefore, a blank block with homogeneous porosity can be produced by the operation of the vacuum pump and the piston. After the blank block is pressed, filtrated and extracted, most of glycerine can be extracted. Then the blank block is cleaned and dried.

The reason to use glycerine (at the same time it also involves water glass and salad oil mentioned in the following examples) is that by means of viscosity of the solution itself, the fibre sections therein can flow three-dimensionally during stirring to attain homogeneous mixing effect among various fibre sections and interweaving effect with each other.

Then the blank block is pressed again to be formed further.

Next the blank block is put into a mould and a plate grid 2 including radial dints is obtained by means of electric spark discharge.

Figure 5:
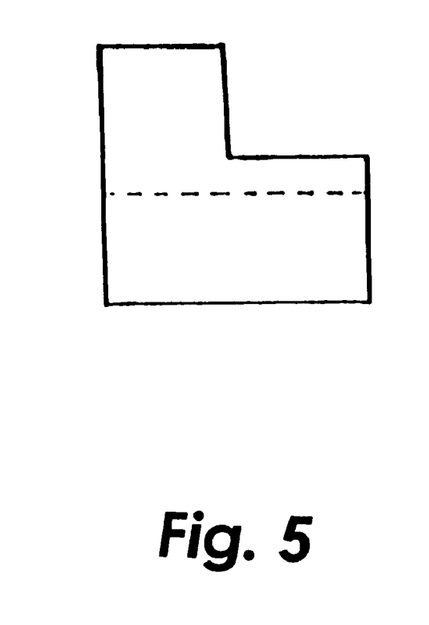
FIG. 5 is a front view of a lug used on the electrode plate shown in FIG. 1; the lug is fitted to the plate grid after the activated base is combined with the plate grid.
Figure 6:
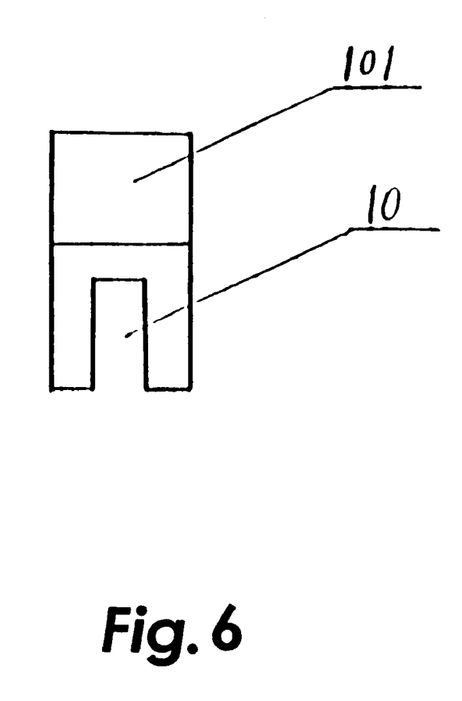
FIG. 6 is a side view of the lug shown in FIG. 5.

Finally, as shown in FIGS. 5 and 6, a lead block 101 which has a groove 10 with a width corresponding to the thickness of the blank block is arranged thereon by means of melting pressing, and an electrode plate for lead acid accumulator is produced.

The plate grid 2 is a frame having aims extending radially or in other direction and making of lead fibre and lead alloy fibre. The configuration of the frame is a square. The activated base 3 is a woolen felt-like porous plate consisting of lead fibre and lead alloy fibre interwoven with each other. The material of the activated base 3 appears in the space between the arms of the frame of the plate grid. The lug 1 is a lead block having a groove 10 with the width corresponding to the thickness of the plate grid 2, and the lug can be fixed on the plate grid through the groove.

EXAMPLE 2

Lead fibre sections with diameter of 80 micrometer and length of 25 mm and lead alloy fibre sections with diameter of 250 micrometer and length of 25 mm are produced according to the method mentioned in example 1. The lead alloy fibre consists of 0.5 wt % cadmium, 1 wt % antimony and 98.5 wt % lead. On the surfaces of the lead fibre and the lead alloy fibre, cadmium which accounts for 5 wt % of their respective weights is plated respectively. The above mentioned lead and lead alloy fibres are mixed according to the weight ratio of 6:4. Then the mixture is poured into the first container filled with water glass solution. At the same time, acrylic fibres accounting for 0.1 wt % of total weight of above two fibres, carbon fibres accounting for 0.1 wt % and carbon powder accounting for 0.1 wt % are added and stirred homogeneously.

Then water glass is extracted and the blank block is dried in the manner of example 1.

A lead alloy fibre felt used with the blank block is produced from lead alloy fibre with diameter of 250 micrometer and length of 25 mm according to the above mentioned method. The lead alloy consists of 7 wt % antinomy, 5 wt % cadmium and 88 wt % lead. One lead alloy fibre felt is then sandwiched between above mentioned two blank blocks. Afterward the sandwich is integrated by heating and pressing. Meanwhile a plate grid with a latticed shape is formed by melting pressing. Finally, after a lug is fixed by melting pressing, an electrode plate according to the present invention is thus produced.

The structure of the electrode plate in the present example is basically similar to that in example 1, and the only difference lies in that the plate grid 2 is a square frame with a latticed shape formed on the sandwich which is obtained after pressing two activated bases with one porous matter sandwiched therebetween wherein the latter is interwoven by lead alloy fibres. Meanwhile, the plate grid 2 and the activated base 3 contain 0.1 wt % acrylic fibres, 0.1 wt % carbon fibres and 0.1 wt % carbon powder.

EXAMPLE 3

As shown in FIGS. 3 and 4, two circular bases 301 and 302 are produced according to the method described in example 1. An elongated notch 9 is formed and extends from the side edge to the centre of the blank block. The inner end 91 of the elongated notch 9 of the base is a semicircle which is coaxial with the circular base. In order to enhance the strength of the base, pressing dints 7 can be formed by melting pressing. However the temperature of melting pressing has to be lower than the melting point of lead.

The circular bases 301, 302 consist of lead fibre which has diameter of 2 micrometer and length of 1 mm and which surface is plated with 2 wt % cadmium and lead alloy fibre which has diameter of 5 micrometer and length of 2.0 mm and which surface is plated with 2 wt % cadmium. The mixing weight ratio between lead fibre and lead alloy fibre is 9:1. The solution to be used is glycerine.

One plate of the bimetallic plate structure is a copper plate 4 with thickness of 0.5 mm. Both faces of this plate 4 are bumped with thorns 6 and are plated with lead having thickness of 0.2 mm. Then it is fixedly connected to a lead plate 5 which has thickness of 0.5 mm. One of the surface of plate 5 is also bumped with thorns 6. In the centre of the plate structure, there is a through hole 8 which shape corresponds to the semicircular inner end 91 of the elongated notch 9 in the circular blank blocks 301, 302.

On each side face of the bimetallic plate structure, a circular base is pricked by thorns 6 respectively. The elongated notches 9 of both bases 301, 302 are arranged in same direction. Then the semicircular through hole 8 on the metallic plate and the semicircular inner ends 91 are filled with pure lead which height should be slightly greater than the thickness of whole electrode plate. Thus an electrode plate for a lead acid accumulator is produced.

EXAMPLE 4

Lead fibre sections with diameter of 60 micrometer and length of 20 mm and lead alloy fibre sections with diameter of 200 micrometer and length of 25 mm are produced according to the method mentioned in example 1. The lead alloy fibre consists of 5 wt % cadmium, 7 wt % antimony and 88 wt % lead. On the surfaces of the lead fibre and the lead alloy fibre, cadmium which accounts for 4 wt % of their respective weights is plated respectively.

The above mentioned lead and lead alloy fibres are mixed according to the weight ratio of 7:3. Then the mixture is poured into salad oil and stirred homogeneously, afterward is poured into a container with a porous bottom. After pressing, filtering and extraction, the blank block is cleaned and dried to have a required form. As an alternative method, gravity-forced extraction may be used so as to clean and dried the blank block.

Then a lead alloy fibre felt is produced according to the method in example 2. The lead alloy fibre making from the felt has diameter of 220 micrometer and includes 5 wt % antimony, 3 wt % cadmium and 92 wt % lead.

Three lead alloy fibre felts and two blank blocks are piled up alternately, then are pressed together by melting pressing. Finally, the above mentioned sandwich is sandwiched between two plate grids having a latticed shape and making of lead alloy. Then they are pressed together by melting pressing. After attachment of lug 1 by melting pressing, an electrode plate according to the present invention is produced.

The structure of the electrode plate produced according to the above mentioned method has a plate grid 2 which is a frame having a lattice shape and make of lead alloy. The activated base 3 is produced from three layers of porous matter of lead alloy fibre and two layers of porous matter of mixed fibre by pressing. Thus an electrode plate with a stratified structure is prepared. The lug 1 is still a lead block having corresponding groove which is used for fixing the lug on the plate grid 2.

EXAMPLE 5

The blank block is produced according to the similar method described in example 2. The blank block consists of lead fibre sections with diameter of 50 micrometer and length of 15 mm and lead alloy fibre sections with diameter of 130 micrometer and length of 15 mm. The lead alloy fibre and lead fibre are mixed according to weight ratio of 2:8. The lead alloy fibre contains 4.5 wt % antimony, 5 wt % cadmium and 90.5 wt % lead.

The lead alloy fibre in the lead alloy felt contains 3 wt % antimony, 4 wt % cadmium and 93 wt % lead.

The blank block is cut into the same shape as that of the electrode plate having an intergal lug 1. Then two blank blocks and one plate grid 2 with a latticed shape are alternately piled up so that the electrode plate can be formed by means of melting pressing using electric spark discharge technology.

EXAMPLE 6

The electrode plate for a lead acid accumulator is produced according to the method mentioned in examples 1–5. The diameter of the lead fibre section is 40 micrometer and its length is 20 mm. The diameter of the lead alloy fibre section is 70 micrometer and its length is 10 mm. The lead alloy fibre consists of 7 wt % antimony, 2.5 wt % cadmium and 90.5 wt % lead. The surfaces of both fibres are plated with cadmium accounting for 2 wt % of their respective weights.

The diameter of lead alloy fibre used in lead alloy fibre felt is 60 micrometer and the fibre consists of 7 wt % antimony, 5 wt % cadmium and 88 wt % lead.

EXAMPLE 7

The electrode plate for a lead acid accumulator is produced according to the method mentioned in examples 1–5. The diameter of the lead fibre section is 15 micrometer and its length is 5 mm. The diameter of the lead alloy fibre section is 8 micrometer and its length is 2 mm. The lead alloy fibre consists of 0.1 wt % silver, 0.08 wt % calcium, 0.5 wt % cadmium and 99.32 wt % lead. The surfaces of both fibres are plated with cadmium accounting for 5 wt % of their respective weights. The mixing weight ratio is 6.5:3.5.

The diameter of lead alloy fibre used in lead alloy fibre felt is 7 micrometer and its length is 15 mm. The lead alloy fibre consists of 0.2 wt % silver, 0.3 wt % calcium, 2 wt % cadmium and 97.5 wt % lead. If it is produced according to the method mentioned in example 2, 0.05 wt % acrylic fibre, 0.05 wt % carbon fibre and 0.05 wt % carbon powder are added. Meanwhile when the electrode plate is produced according to the methods mentioned in examples 1–5, it can be imprenated with 0.1–0.5 wt % polytetrafluoroethlene.

EXAMPLE 8

The electrode plate for a lead acid accumulator is produced according to the method mentioned in examples 1–5. The diameter of the lead fibre section is 5 micrometer and its length is 3 mm. The surface thereof is plated with cadmium accounting for 5 wt %. The diameter of the lead alloy fibre section is 20 micrometer and its length is 5 mm. The surface thereof is not plated with cadmium. The lead alloy fibre consists of 0.5 wt % silver, 0.5 wt % calcium, 5 wt % cadmium and 94 wt % lead.

The diameter of lead alloy fibre used in lead alloy fibre felt is 7 micrometer and the fibre consists of 0.1 wt % silver, 0.08 wt % calcium, 0.5 wt % cadmium and 99.32 wt % lead. After the electrode plate is produced in examples 1–5, the electrode plate can be impregated further with lead powder using chemical impregating method.

EXAMPLE 9

The electrode plate for a lead acid accumulator is produced according to the method mentioned in examples 1–5. The diameter of the lead fibre section is 2 micrometer and its length is 0.7 mm. The surface thereof is plated with cadmium accounting for 1 wt % . The diameter of the lead alloy fibre section is 2 micrometer and its length is 0.7 mm. The surface thereof is plated with cadmium accounting for 1.5 wt %. The lead alloy fibre consists of 0.3 wt % silver, 0.2 wt % calcium, 2 wt % cadmium and 97.5 wt % lead.

The diameter of lead alloy fibre used in lead alloy fibre felt is 2 micrometer and the fibre consists of 0.5 wt % silver, 0.5 wt % calcium, 5 wt % cadmium and 94 wt % lead. When the electrode plate is produced, one plate of the bimetalic plate structure is a silver plate. After the electrode plate is produced according to the method described in examples 1–5, the electrode plate can be impregated further with lead powder directly.

Industry Realization

1. Since the pure lead fibre is used as activated material for storing electricity in the fibre felt, and the surface area thereof is larger than that of granula, lead powder and a lead foil, the utilization factor-of activated material is raised and the specific energy is raised too.

2. Since the surface layer of lead fibre always remains in $\beta$-$PbO_2$ crystal lattice under charging condition, which has high electricity storage ability, the surface area and the utilization factor of the activated material and the specific energy are radiacally raised further.

3. Since the plate grid and the lug can be directly formed on the lead fibre felt by melting pressing, the relative weight of the plate grid is reduced and the relative content of the activated electricity storage material is increased, and therefore the specific energy is also raised.

4. Since the activated base is produced by homogeneously mixing lead alloy fibre and lead fibre, the fibres are interwoven with each other and the nodes are slightly melted together. In addition, the plate grid, the frame and the lug are directly formed on the base by melting pressing so that the whole fibre felt forms a reliable and integrated network for current collection and electricity conduction and that an integrated porous electrode plate having high mechanical strength is formed. Therefore for such an electrode plate, its lifetime is long and the interior resistance is low. Meanwhile, the electrode plate possesses the satisfactory properties such as capability for large current and rapid discharge, high specific power, capability for rapid charging and resistance to overdischarge.

5. The electrode plate is formed from a combination of two activated bases with one bimetalic plate structure. The bimetallic plate structure can not only substitute the insulating partition, but also can play a role for electrically connecting electrode plates between single cells in series. Meanwhile the bimetallic plate structure is composed of very thin metallic plates, which have high electrical conductivity and large contact area with the base, so that the interior resistance of accumulator can be further reduced, and that the weights of housing and lead connecting members are further reduced. Thus the specific power and the specific energy of the accumulator are further raised.

The tested main specifications of the accumulator using the electrode plate according to the present invention are proved as follows (discharge under heavy load traction):

A. the minimum specific energy can be of 52 watt-hour/kg
B. the minimum specific power can be of 150 watt/kg
C. the minimum lifetime can be of 800 cycles.

What is claimed is:

1. An electrode plate for a lead acid accumulator characterized in comprising:
   an activated base, including lead fibre and cadmium containing lead alloy fibre which are mixed and interwoven homogeneously; said lead fibre accounting for 60–90 wt % of said base, and the surface of said lead fibre being plated with cadmium accounting for 1–5 wt % of the total weight of said lead fibre;
   a plate grid for collecting current and conducting electricity in combination with said activated base; and
   a lug, used in the electrical connection between the electrode plates and electrically connected and fixed on said plate grid.

2. An electrode plate as claimed in claim 1 characterized in that the respective weight percentages of compositions in said lead alloy fibre are: 88–98.5 wt % for lead, 1–7 wt % for antimony and 0.5–5 wt % for cadmium.

3. An electrode plate as claimed in claim 1 characterized in that the respective weight percentages of compositions in said lead alloy fibre are: 94–99.32 wt % for lead, 0.5–5 wt % for cadmium, 0.08–0.5 wt % for calcium and 0.1–0.5 wt % for silver.

4. An electrode plate as claimed in claim 1 characterized in that the surface of said lead alloy fibre is also plated with cadmium and that said cadmium accounts for 1–5 wt % of said lead alloy fibre.

5. An electrode plate as claimed in claim 1 characterized in that one or more of carbon fibre, organic chemical fibre and carbon powder is contained in said base.

6. An electrode plate as claimed in claim 1 characterized in that said base further includes polytetrafluoroethylene which accounts for 0.1–0.5 wt % of said base.

7. An electrode plate as claimed in claim 1 characterized in that said plate grid is of frame shape and its interior has a plurality of strips.

8. An electrode plate as claimed in claim 7 characterized in that said strips extend radially from the connection point of said plate grid with said lug.

9. An electrode plate as claimed in claim 8 characterized in that said plate grid is integrally formed on said base by melting pressing process.

10. An electrode plate as claimed in claim 8 characterized in that said plate grid is a removable member made from lead alloy.

11. An electrode plate as claimed in claim 8 characterized in that on the bottom of said lug there is a groove, the width of which is equal to the thickness of said plate grid so that said lug can be fixed thereon.

12. An electrode plate as claimed in claim 1 characterized in that said electrode plate includes further a bimetallic plate structure for supporting said base; said bimetallic plate structure including two plates in which one plate is a lead and the other is a copper or silver one having a lead layer plated on its surface; these two plates are fixed together face to face and both sides of the bimetallic plate structure are used respectively for fixing one said base respectively of side bases.

13. An electrode plate as claimed in claim 12 characterized in that in the centre of said bimetallic plate structure there is a hole; said base located on each side of the bimetallic plate structure has a respective elongated notch extending from its circumference to its center; the end of said elongated notch near the center of the base is a semicircle; said elongated notches are aligned with each other and their semicircular ends are aligned with said hole so as to form a through hole; lead is fully filled in said through hole to form a lug, the width of which is greater than the thickness of the electrode plate consisting of the bimetallic plate structure and the bases.

14. An electrode plate as claimed in claim 8 characterized in that said base is a stratified structure, wherein one layer is a blank consisting of lead fibre and cadmium-containing lead alloy fibre, which are mixed homogeneously and interwoven together; the other layer is lead alloy fibre felt consisting of another cadmium-containing lead alloy fibre interwoven together; the blank and the lead alloy fibre felts are piled up alternately to form said stratified structure.

15. An electrode plate as claimed in claim 8 characterized in that,
    on the surfaces of said lead fibre and said lead alloy fibre, cadmium is plated, which accounts for 2 wt % of their respective weight;
    the compositions of said lead alloy fibre are of 96 wt % lead, 2 wt % antinomy and 2 wt % cadmium;
    the weight ratio between said lead fibre and said lead alloy fibre is 9:1.

16. An electrode plate as claimed in claim 14 characterized in that,
    said base is a three-layer structure; the first and the third layer are said blank blocks, wherein on the surfaces of said lead fibre and said lead alloy fibre cadmium is plated, which accounts for 2 wt % of their respective weight;
    the compositions of said lead alloy fibre are of 98.5 wt % lead, 1 wt % antinomy and 0.5 wt % cadmium;
    the weight ratio between said lead fibre and said lead alloy fibre is 6:4;
    0.1 wt % acrylic fibres, 0.1 wt % carbon fibres and 0.1 wt % carbon powder are further included; and
    said second layer is lead alloy fibre felt consisting of 88 wt % lead, 7 wt % antinomy and 5 wt % cadmium.

17. An electrode plate as claimed in claim 13 characterized in that,
    on the surfaces of said lead fibre, cadmium is plated, which accounts for 2 wt % of the total weight of lead fibre;
    the weight ratio between said lead fibre and said lead alloy fibre is 9:1.

18. An electrode plate as claimed in claim 14 characterized in that,
    said base is a five-layer structure; the second and the fourth layers are said blank blocks, wherein:
        on the surfaces of said lead fibre and said lead alloy fibre, cadmium is plated, which accounts for 4 wt % of their respective total weight;
        the compositions of said lead alloy fibre are of 88 wt % lead, 7 wt % antinomy and 5 wt % cadmium;
        the weight ratio between said lead fibre and said lead alloy fibre is 7:3;
        said first, third and fifth layers are said lead alloy fibre felt, and the compositions of the lead alloy fibre are of 92 wt % lead, 5 wt % antinomy and 3 wt % cadmium;
    said plate grid is a separate member making from lead alloy fibre, and said plate grids located on both sides of said base are pressed together with said base by melting pressing.

19. An electrode plate as claimed in claim 14 characterized in that,
    said base is a three-layer structure, wherein in the first and the third layer:
        on the surfaces of said lead fibre and said lead alloy fibre, cadmium is plated, which accounts for 2 wt % of their respective weight;
        the compositions of said lead alloy fibre are of 90.5 wt % lead, 4.5 wt % antinomy and 5 wt % cadmium;
        the weight ratio between said lead fibre and said lead alloy fibre is 8:2;
    said second layer is lead alloy fibre felt, and the compositions of the lead alloy fibre are of 93 wt % lead, 3 wt % antinomy and 4 wt % cadmium; and
    said plate grid is a separate member making from lead alloy fibre and two said plate grids and two said bases are piled up alternately and pressed together by melting pressimg.

20. An electrode plate as claimed in claim 14 characterized in that,
    in said blank block:
        on the surfaces of said lead fibre and said lead alloy fibre, cadmium is plated which accounts for 2 wt % of their respective weight,
        the compositions of said lead alloy fibre are of 90.5 wt % lead, 7 wt % antinomy and 2.5 wt % cadmium;
    in said lead alloy fibre felt:
        the compositions are of 88 wt % lead, 7 wt % antinomy and 5 wt % cadmium.

21. An electrode plate as claimed in claim 14 characterized in that,
    in said blank block:
        on the surfaces of said lead fibre and said lead alloy fibre, cadmium is plated, which accounts for 5 wt % of their respective weight,
        the compositions of said lead alloy fibre are of 99.32 wt % lead, 4.5 wt %, 0.5 wt % cadmium, 0.08 wt % calcium and 0.1 wt % silver,
        the weight ratio between said lead fibre and said lead alloy fibre is 6.5:3.5, 0.05 wt % acrylic fibres, 0.05 wt % carbon fibres and 0.05 wt % carbon powder are further included;
    in said lead alloy fibre felt:
        its compositions are of 97.5 wt % lead, 2 wt % cadmium, 0.3 wt % calcium and 0.2 wt % silver.

22. An electrode plate as claimed in claim 14 characterized in that,
    in said blank block:
        on the surface of said lead fibre, cadmium is plated, which accounts for 5 wt % of the total weight of said lead fibre,
        the compositions of said lead alloy fibre are of 94 wt % lead, 5 wt % cadmium, 0.5 wt % calcium and 0.5 wt % silver,
        the weight ratio between said lead fibre and said lead alloy fibre is 6.5:3.5;
    in said lead alloy fibre felt:

its compositions are of 99.32 wt % lead, 0.5 wt % cadmium, 0.08 wt % calcium and 0.1 wt % silver.

23. An electrode plate as claimed in claim 13 characterized in that, in said blank block:

on the surfaces of said lead fibre and said lead alloy fibre, cadmium is plated, which accounts for 1 wt % and 1.5 wt % of their respective total weight, the compositions of said lead alloy fibre are of 97.5 wt % lead, 2 wt % cadmium, 0.2 wt % calcium and 0.3 wt % silver;

in said lead alloy fibre felt:

its composition are of 94 wt % lead, 5 wt % cadium, 0.5 wt % calcium and 0.5 wt % silver.

* * * * *